United States Patent Office 2,761,247
Patented Sept. 4, 1956

2,761,247

PROCESS FOR CONDITIONING SOIL WITH POLYSACCHARIDE XANTHATES

Geoffrey W. Meadows, Kennett Square, Pa., assignor to E. I. du Pont de Nemours and Company, Wilmington, Del., a corporation of Delaware No Drawing. Application December 10, 1953, Serial No. 397,480

7 Claims. (Cl. 47—58)

This invention relates to methods for improving the physical structure of soil; in other words, for doing what is now commonly called soil conditioning.

More particularly, the invention relates to soil conditioning methods comprising applying to the soil a xanthate of a polysaccharide which is selected from the group consisting of pentosans and hexosans. For convenience, these soil conditioning agents will be referred to hereinafter more briefly as polysaccharide xanthates.

This application is a continuation in part of my co-pending application Serial No. 360,591, filed June 9, 1953 (now abandoned).

The polysaccharide xanthates are conveniently prepared by soaking the polysaccharide in an alkali and then treating the alkali polysaccharide which is formed with carbon disulfide. The method is well known with reference to one hexosan, namely cellulose, since it is used to prepare cellulose xanthate in processes for the manufacture of viscose rayon fiber and cellophane. Thus cellulose xanthate salts such as the sodium or potassium salts are made according to such methods, for example, by treating pulped, shredded, or otherwise finely divided cellulose with strong sodium or potassium hydroxide solution and the resulting material is then treated with carbon disulfide. The method and the details of the chemistry involved are fully described in Heuser "The Chemistry of Cellulose," John Wiley and Sons, 1944, chapter 8.

The polysaccharide xanthates employed in the processes of this invention are conveniently represented by the formula

$$[C_nH_{2n-2-m}O_{n-1}(CSSA)_m]_x$$

where $n$ is 5 or 6, $m$ is from 0.1 to 3.0 and more preferably from 0.5 to 1.5, $x$ is the degree of polymerization, and A is a metal or other salt forming group, or ester forming group such as methyl, ethyl, etc.

Illustrative of the polysaccharide xanthates useful in the methods of this invention are those obtained by xanthation of cellulose, starches, dextrins, hemi-celluloses, pectins, dextrans, levans, laminarons, agars and xylans. The xanthates can be prepared from these polysaccharides of commerce or more economically they can be prepared by direct xanthation of crudes such as wood pulp, cotton linters, saw dust, corn cobs, seed hulls, straw, sea weed, fruit pulp, sugar beet pulp, bagasse, waste paper, rags, potatoes, wheat, rice and corn.

While xanthates of low molecular weight polysaccharides, both linear and branched, for example those obtained by xanthation of hemi-cellulose from wood and agar from sea weed, may be used, the xanthates of high molecular weight branched polysaccharides such as those obtained by xanthation of starches from corn or potato have greater soil conditioning activity. Still more preferred because of their greater soil conditioning activity are the xanthates of high molecular weight linear polysaccharides, for example such as those obtained by xanthation of cellulose from cotton linters or wood pulp.

Water solubility is a desired characteristic of the polysaccharide xanthates employed in the methods of this invention and this property is obtained by providing sufficient xanthation of the polysaccharide. With lower molecular weight polymers, water solubility is attained by having as little as an average of .1 xanthate groups per saccharide unit while with the higher molecular weight linear polymers somewhat greater xanthation, for example in the order of at least .6 xanthate groups per saccharide unit, gives desired water solubility.

The polysaccharide xanthates are employed in the methods of this invention in the form of their salts or esters. Thus the radical A shown in the above formula can be a monovalent cation such as obtained from sodium, potassium, lithium, ammonium, tetramethylammonium, and other quaternary ammonium ions. Polyvalent cationic radicals can also be used, for example, magnesium, calcium, strontium, iron, zinc, aluminum, copper, and barium. The radical A can also be organic so that the resulting compound is a xanthate ester; thus A can be methyl, ethyl, propyl, isopropyl or other organic radical linked to the xanthate radical thru carbon, and more preferably such organic radicals substituted with water solubilizing groups such as hydroxyl or carboxyl are also useful.

The polysaccharide xanthate compositions can be applied to the soil following conventional soil conditioning techniques. Thus the xanthates can be applied in dry form to the surface of the soil for admixture therewith, or alternatively, they can be applied from liquid dispersions, or, in the case of water soluble polysaccharide xanthates, from aqueous solutions.

The rate or dosage of application of the polysaccharide xanthate to the soil to obtain the desired improvement in soil texture or erosion control will vary with the particular polysaccharide xanthate used and with the soil type. In general, satisfactory results will be obtained by applying the composition in amount sufficient to obtain a polysaccharide xanthate concentration in the soil of from about 0.001 to 1% by weight, and more usually from about 0.01% to 0.1% by weight; in other words, application of the composition is continued until the soil to be conditioned contains an amount of the polysaccharide xanthate within that range, based on the dry weight of the soil.

If application of the soil conditioning agent is to be made from aqueous solution as, for example, by the application of a solution of sodium polysaccharide xanthate or similar water soluble composition, I have found that best results are obtained by first adjusting the pH of the solution to be applied to a pH within the range of about 7.0 to 12.0. In adjusting the pH, care should be taken to avoid precipitating polysaccharide by too rapid a lowering of the pH.

The invention is further illustrated by the following examples which show the preparation of various polysaccharide xanthates, their application for conditioning soil, and the soil conditioning results obtained thereby.

*Example 1*

605 parts by weight of cotton linters having a degree of polymerization of about 1800 were steeped in 10,000 parts by weight of an 18% aqueous sodium hydroxide solution for 30 minutes. The resulting alkali cellulose was then pressed to a weight ration of 3:1 based on the original dry cellulose, shredded, and carbon disulfide was added in amount corresponding to 62% by weight based on the initial dry cellulose. Xanthation was carried out with agitation at 25° C. for 5 hours.

The cellulose xanthate crumbs which formed were dissolved over a period of about 1½ hours at approximately 5° C. in soduim hydroxide to give a clear viscous solution containing 4.8% cellulose xanthate and 6% sodium hydroxide. The cellulose xanthate contained about one xanthate group per saccharide unit; thus, $m$ in the formula given above was approximately one.

The cellulose xanthate composition, prepared as above, was applied to soil under various conditions to be described hereinafter.

The soil used in the evaluations in this and the subsequent examples was a silt loam sub-soil obtained from Newark, Delaware. The physical analysis of the soil showed it to contain 26% sand, 50% silt, and 18% clay. By chemical analysis, the soil was found to have an organic content of 4.5% and a nitrogen content of 0.11%. Reference in this and subsequent examples to parts by weight of soil means parts by weight on a dry basis.

The cellulose xanthate compositions were applied as aqueous solutions referred to hereinafter as solutions A, B, and C. Solutions A and B were prepared by slowly adding a solution of sodium dihydrogen phosphate to the cellulose xanthate composition described above to reduce the pH of the solution to 7.0 and 11.0 respectively. To prepare composition C, the above described cellulose xanthate solution was neutralized with acetic acid to pH 9.2.

Each of the aforementioned pH adjusted solutions A, B, and C was applied to a separate portion of soil in amount sufficient to provide 0.06 part by weight of the cellulose xanthate per 100 parts by weight of soil, and the soil was worked into a paste-like mass.

The soil thus treated was allowed to age for about one hour and was then evaluated to determine the soil conditioning action of the composition applied by using the standard so-called "wet sieve" procedure disclosed in Bryant, J. C., Bendixen, T. W., and Slater, C. S. (Measurement of the Water Stability of Soils), Soil Science, 65, 341–5 (1948).

Basically, the evaluation tests involve first passing the aged treated soil paste through a 5 mm. round hole screen to provide crumb-like particles which are then dried at 40° C. in an air circulating oven for 24 hours and then screened using a 3 mm. round hole screen to remove fine dust; a 25 gram sample of the dried soil crumbs retained on the 3 mm. screen is then charged into a 10-mesh U. S. Bureau of Standards series sieve which is placed on top of a 35-mesh sieve. The two sieves are fastened together and immersed in a bath of water and the soil crumbs are soaked in the water for a period of one minute. The sieves are then mechanically raised and lowered in the bath through a stroke length of three-quarters inch, thirty-five times a minute for 2 minutes. The soil remaining on the sieves is then dried and weighed and the dry weight of the crumbs remaining on the screens is expressed as the percentage of the original soil crumbs charged. The test is designed to show the percentage of stable soil aggregates of size greater than 0.5 mm. and thus provides a comparative measure of the soil aggregating or conditioning action of the material being tested.

The soil when tested alone by the above described method contained about 6% soil aggregates greater than 0.5 mm. In comparison with this untreated material, it was found that the soil treated with composition A contained about 60% soil aggregates greater than 0.5 mm., the soil treated with composition B contained about 98% soil aggregates greater than 0.5 mm., and the soil treated with composition C contained about 94% soil aggregates greater than 0.5 mm.

Upon application of compositions of this example to soils which were subsequently planted to corn, it was noted that germination of the seeds was better in the treated plots than in untreated plots and that the seedlings grew more rapidly.

*Example 2*

Starting with wood pulp cellulose having a degree of polymerization of about 450, an alkaline cellulose xanthate solution was prepared using the procedure described in Example 1. A clear, viscous solution was obtained containing 9.1% cellulose xanthate and 6.0% sodium hydroxide. The cellulose xanthate contained about 0.5 xanthate groups per saccharide unit.

The solution, neutralized to pH 9.0 by the addition of sodium dihydrogen phosphate solution, was applied to the test soil in amount sufficient to provide 0.04 and 0.06 part by weight of the cellulose xanthate per 100 parts by weight of the soil, and the treated soil was evaluated by the wet sieve test in the manner previously described in Example 1.

The soil treated at the 0.04% level contained about 84% soil aggregates greater than 0.5 mm., and the soil treated at the 0.06% level contained about 98% soil aggregates greater than 0.5 mm.

*Example 3*

Starch xanthate was prepared by reacting 25 parts by weight of potato starch with 250 parts by weight of an 18% solution of sodium hydroxide and 11.6 parts by weight of carbon disulfide. The resulting paste, when diluted five-fold by the addition of water, gave a clear solution which was applied to the test soil in amount sufficient to provide 0.065 part and 0.11 part by weight of the starch xanthate per 100 parts by weight of soil and the treated soils tested by the wet sieve procedure described in Example 1.

The soil treated at the 0.065% level contained about 51% stable aggregates greater than 0.5 mm., and the soil treated at the 0.11% level contained about 94% soil aggregates than 0.5 mm.

*Example 4*

A crude cellulose xanthate was prepared by reacting 50 parts by weight of sawdust with 500 parts by weight of an 18% aqueous solution of sodium hydroxide and 23.2 parts by weight of carbon disulfide. The resulting slurry, when diluted five-fold by the addition of water, gave a cloudy viscous solution which was applied to the test soil in amount sufficient to provide 0.19 part and 0.27 part by weight of the total solids per 100 parts by weight of soil and the treated soil was tested by the wet sieve procedure as described in Example 1.

The soil treated at the 0.19% level contained about 67% soil aggregates greater than 0.5 mm. and the soil treated at the 0.27% level contained about 95% soil aggregates greater than 0.5 mm.

*Example 5*

Cellulose xanthate crumbs were prepared starting from cotton linters and using the procedure described in Example 1. The crumbs were dried by heating in an air circulating oven for one hour at about 70° C., and the product was micropulverized using a 0.035 inch herringbone screen. The powder thus obtained was further dried by heating for one hour at about 70° C. in an air circulating oven.

The powdered solid was dry mixed with the test soil in amount sufficient to provide 0.08 part by weight of the cellulose xanthate per 100 parts by weight of soil and sufficient moisture was added to enable the soil to be worked into a paste-like mass. After allowing to age for about one hour, the soil paste was pressed into crumb-like particles which were dried and tested by the wet sieve procedure already described in Example 1.

The soil thus treated contained about 99% soil aggregates greater than 0.5 mm.

*Example 6*

Sodium cellulose xanthate prepared in dry powdered form by the procedure described in Example 5 was dissolved in water to give a solution containing about 0.5% of the active ingredient. This solution was applied using conventional spray equipment to a freshly disked soil embankment in amount sufficient to distribute 0.5 pound of the active ingredient per 100 square feet of surface. This rate of application corresponds to the provision of approximately 0.03% by weight of the active ingredient in the soil based on the dry weight of the soil. The soil embankment was 50 feet long and had a gradient of 15%.

Wet sieve tests on soil samples taken from an untreated portion of the embankment and on samples taken from the treated embankment showed that the percentage stable aggregates greater than 0.5 mm. had been increased from 40% in the case of the untreated slope to 67% in the case of the treated slope.

After a period of six weeks during which the embankment was exposed to several violent rain storms, the cellulose xanthate treated portion was in excellent condition whereas the untreated portion had eroded and was traversed by deep gullies.

The foregoing detailed description has been given for clearness of understanding only and no unnecessary limitations are to be understood therefrom. The invention was not limited to the exact details shown and described for obvious modifications will occur to those skilled in the art.

I claim:

1. A method for conditioning soil which comprises applying to the soil a xanthate of a polysaccharide, the polysaccharide being selected from the group consisting of pentosans and hexosans.

2. A method for conditioning soil which comprises applying to the soil a xanthate of a polysaccharide, having from 0.1 to 3.0 xanthate groups per saccharide unit, the polysaccharide being selected from the group consisting of pentosans and hexosans.

3. A method for conditioning soil which comprises incorporating in the soil about 0.001% to 1% by weight based on the dry weight of the soil of a xanthate of a polysaccharide, the polysaccharide being selected from the group consisting of pentosans and hexosans.

4. A method for conditioning soil which comprises applying to the soil about 0.01% to 0.1% by weight based on the dry weight of the soil to be conditioned of a xanthate of a polysaccharide having from 0.1 to 3.0 xanthate groups per saccharide unit, said polysaccharide being selected from the group consisting of pentosans and hexosans.

5. A method for conditioning soil which comprises applying to the soil a cellulose xanthate.

6. A method for conditioning soil which comprises applying to the soil a starch xanthate.

7. A method for conditioning soil which comprises applying to the soil about 0.01% to 0.1% by weight based on the dry weight of the soil to be conditioned of a cellulose xanthate having from 0.1 to 3.0 xanthate groups per saccharide unit.

References Cited in the file of this patent

UNITED STATES PATENTS

| | | |
|---|---|---|
| 2,174,027 | Ball | Sept. 26, 1939 |
| 2,187,532 | Leatherman | Jan. 16, 1940 |
| 2,303,552 | Howe | Dec. 1, 1942 |
| 2,425,768 | Wagner | Aug. 19, 1947 |
| 2,475,485 | Dyke | July 5, 1949 |
| 2,523,977 | Wagner | Sept. 26, 1950 |
| 2,552,775 | Fischer | May 15, 1951 |
| 2,625,529 | Hedrick | Jan. 13, 1953 |

FOREIGN PATENTS

| | | |
|---|---|---|
| 458,388 | Great Britain | Dec. 18, 1936 |

OTHER REFERENCES

Geoghegan: "Aggregate Formation in Soil," pub. 1950 at Groningen, Netherlands, in 4th International Congress of Soil Science, Amsterdam, 1950, Transactions, vol. 1, pp. 198–201.